June 14, 1966 H. E. BESTE 3,256,387

PANORAMIC TV PERISCOPE

Filed Aug. 1, 1962 2 Sheets-Sheet 1

INVENTOR.
Harold E. Beste

BY William J. Pesce

ATTORNEY.

INVENTOR.
Harold E. Beste
BY [signature]
ATTORNEY.

United States Patent Office 3,256,387

Patented June 14, 1966

3,256,387

PANORAMIC TV PERISCOPE

Harold E. Beste, Verona, N.J., assignor to Vare Industries, Inc., Roselle, N.J., a corporation of New Jersey Filed Aug. 1, 1962, Ser. No. 214,126
7 Claims. (Cl. 178—6.8)

This invention relates to periscopes in submarines and is particularly directed to television type periscopes for panoramic viewing from a submerged submarine.

Presently submarines submerged utilize an optically arranged periscope for viewing the surface above, and to obtain an omnidirectal view the observer must rotate the periscope tube in which the lens array is placed, walking himself in a circular orbit in order to obtain the desired view. The view observed will depend completely on the observer himself, his storage faculties and image viewing capabilities so as to determine and ascertain the completeness and reliability of the picture under observation.

The length of the periscope tube, which houses the complete lens array, is necessarily limited by the height of the submarine. Extending the length of the periscope by telescopic means presents optical and associated vibrational problems when the craft is at periscope depth (the depth the submarine descends to permit a minimum amount of the periscope eye to become exposed above the surface). If it were possible to lengthen the periscope tube, the craft could descend still further, as to periscope depth, thereby increasing the safety factor with respect to possible detection.

In order to view the horizon in a minimum of time and also provide possible means for increasing the so-called periscope depth, a television type periscope vehicle is herewith contemplated whereby the shortcomings stated above may be alleviated. In effect, what is contemplated is the use of a TV panoramic television type periscope which renders quick viewing of the entire horizon in "up periscope" time of 5 seconds or less. The image orthicon pick-up tube and its associated deflection circuits and video amplifiers are disposed within the periscope tube at its upper extremity close to the lens arrangement which views the horizon through a 90° right angle prism. The optical portion of the periscope, hereinafter called optical head, will rotate in a manner to be presently described according to the invention embodied herein. It is also possible to rotate the camera along with the optical head if conducting slip rings are provided.

The periscope in particular is made to rotate several degrees at descrete intervals and stopped so as to permit equal segments of the horizon to be viewed. The picture information resulting therefrom is stored on appropriate storage devices and subsequently viewed on an array of television monitors, each monitor being allocated a particular segment of the horizon. The completed panoramic view of the horizon is thus thereby displayed on a plurality of picture monitors for viewing and scrutinized for further study and concentration.

Where the television periscope is used during periods of very low illumination, the camera can be operated at extended exposure, that is to have the television camera in a recording position for a longer period of time, to permit the acquisition of a larger video signal.

It is, therefore, one of the principal objects of this invention to provide an improved periscope viewing system for submarines with an increased area of view.

Another object of the invention is to provide a television type periscope viewing system for submarines which affords a complete panoramic view of the area under surveillance.

Another object of the invention is to provide a television type periscope viewing system for submarines which increases the periscope tube length and the periscope viewing depth of the submarine and decreases the chances of its detection.

Another object of the invention is to provide a television type periscope viewing system for submarines which increases the sensitivity of the method of observation and permits the storage of observed information in one or more given locations for immediate or extended periods of display and viewing.

A still further object of the invention is to provide a periscope type viewing system for submarines which is highly sensitive, efficient, easily controllable, fast acting and designed to produce a panoramic view in a minimum amount of time.

Other objects and advantages will become apparent from a reading of the following specifications and a study of the accompanying drawings wherein.

Figure 1:
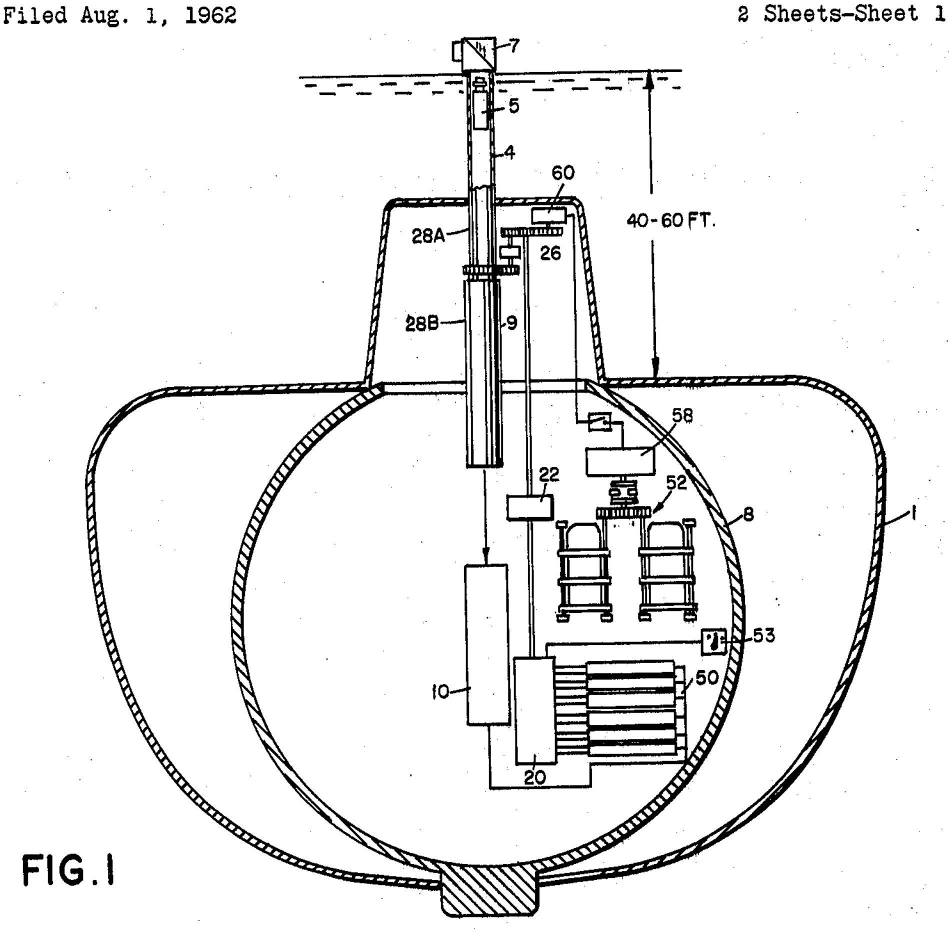
FIG. 1 shows in cross section a portion of a submarine at periscope depth with the TV periscope and accompanying apparatus located therein according to the invention.

Now referring to the drawings and in particular to FIG. 1 there is shown therein a cross-section along the central portion of a submarine 1 at periscope depth below the surface of the water 2 with its periscope 3 in up position. In particular, the periscope system comprises a periscope tube 4 which has fixedly positioned therein at the upper extremity thereof a television camera 5 which camera is composed generally of a sensitive image orthicon tube or image intensifier type image orthicon and the necessary deflection circuits and preamplifier for its operation. The image orthicon 5 contains its own lens assembly 6 which is disposed to look into a right angle prism or mirror 7 for viewing the horizon above the water surface 2. The remainder of the television system is contained in the hull portion 8 within the body of the submarine and connected to the camera via a flexible conduit 9 which houses all of the necessary connecting cables.

The remainder of the television system is composed of the usual video processing amplifiers, timing generators for blanking and controlling the horizontal and vertical sweeping voltages, these respective apparatus being confined to a single unit 10. The video information as derived from the television camera tube and suitably processed thereafter is then transmitted to a storage system 12 where the televised image is stored for some measure of time and thereafter transmitted (read out) to television monitors 14 for ultimate viewing. Each of the respective monitors is positively identified with respect to the particular field of view of the periscope by means of suitable tapes which have compass markings thereon comparable to the position of the periscope.

Figure 2:
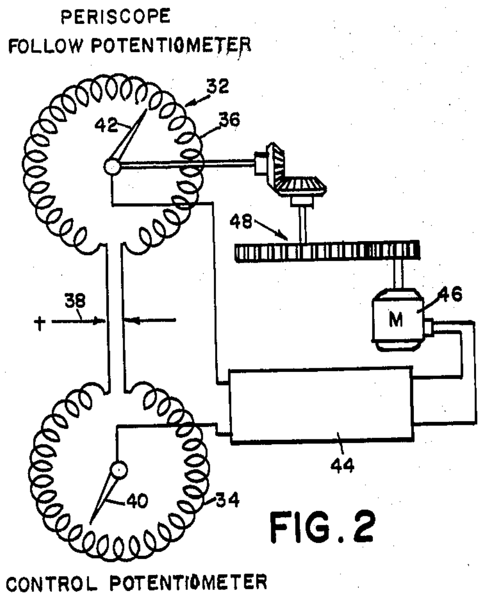
FIG. 2 is a control diagram for controlling the rotational movement of the periscope from a remote location with either direct or selective programming control modes.
Figure 3:
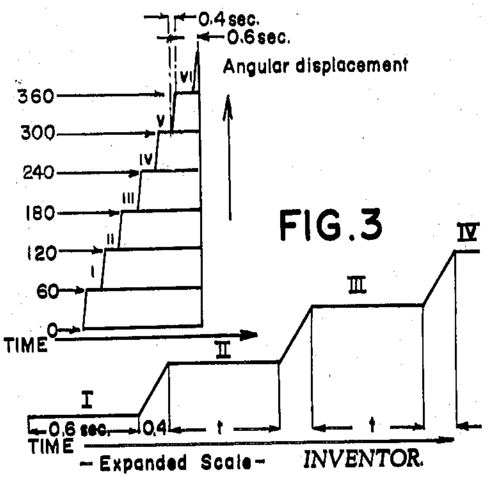
FIG. 3 is a time-position exposure type diagram of the television periscope.
Figures 4, 5, 6:
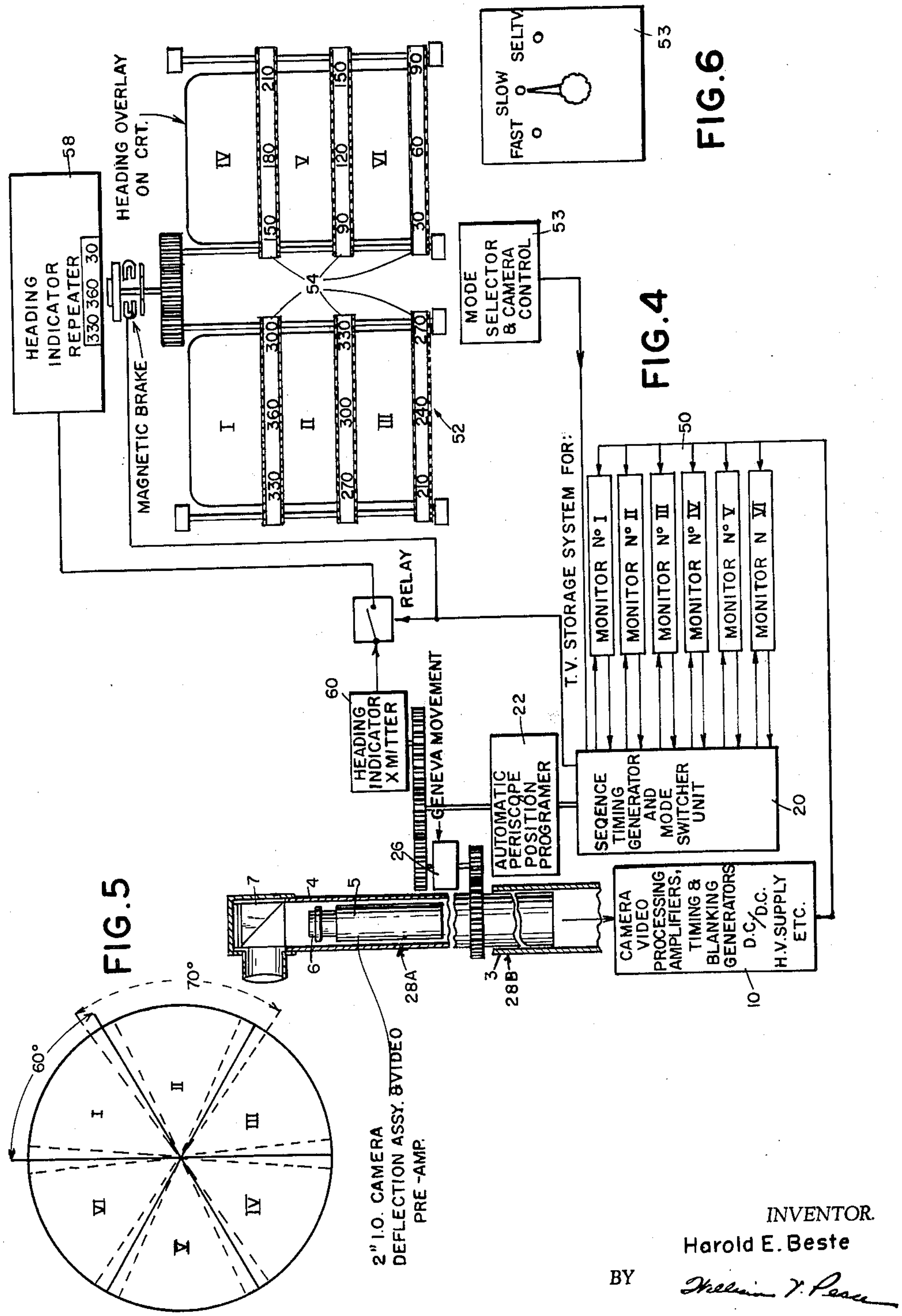
FIG. 4 is a schematic diagram of the panoramic television periscope system.
FIG. 5 is a circular diagram which indicates the respective angular position of the periscope during exposure and transition time periods.
FIG. 6 is a control panel board which indicates the particular program mode for the movement of the television periscope.

For panoramic operation, the periscope is made to undergo a complete revolution in equal increments of time so as to undergo equal angular displacements. In other words, the periscope will have approximately six positions in which exposure takes place so as to complete the complete circular or panoramic view. As the periscope undergoes its rotational movement, the television camera is blanked out so as not to have any exposure during the angular traverse. In FIG. 3 there is shown in particular a time verses angular displacement diagram which shows six 60° intervals during which exposure takes place. In particular, the diagram on an expanded scale basis shows or indicates exposure time of 0.6 second as compared to traverse time of 0.4 second. The timing sequence for the rotational movement of the periscope is controlled by a sequence timing generator 20 which is set according to a mode positioning programmer 22 which selectively determines the particular mode of operation or program. In other words, for automatic operation and for a given timing sequence the programmer is first prearranged and made to control the timing sequence of the timing generator. The means for producing the rotational movement to advance the periscope quickly to the next position may be accomplished through the utilization of a Geneva type movement mechanism. As shown in FIG. 4, the Geneva movement through the programmer 22 and timing generator mechanism 20 drives a master gear arrrangement 24 which in turn drives gear assembly 26 attached to the upper periscope tube 28A. The programmer and the associated gearing arrangement provides the traverse angular sequential movement of the periscope for exposure purposes thereby rendering automatically a completed panoramic observation of the surrounding area. It may be appreciated that the timing sequence as determined by the timing generator and the motor movement selection in association with the Geneva movement may undergo various changes with respect to both rotation and exposure, depending on the effect desired or contemplated. However, instead of having the sequencing arrangement as above stated, it may be possible to have selective viewing, viewing of only one given area, by remote control positioning. In particular, it can be seen in FIG. 2 that any position of a remote control mechanism 30 will produce a similar movement of a periscope to which is attached a typically slave type mechanism 32. Essentially there is shown in FIG. 2 a differential control amplifier system wherein one control potentiometer 34 is positioned at a remote station for manual control and the follow potentiometer 36 fixedly disposed within the peripscope apparatus ultimately attains a corresponding position. The two potentiometers have applied thereto a source of potential 38 which effects an imbalance therebetween when the potentiometer arm 40 and the potentiometer arm 42 coupled to the periscope are not in operational alignment. This misalignment provides a pair of voltages that differ which are then applied to a differential D.C. amplifier arrangement 44, the output thereof which drives a motor mechanism 46 which in turn drives gearing arrangement 48. The gearing arrangement 48 is such that it rotates the upper periscope tube and consequently transmits the corrective displacement to the periscope follow potentiometer arm 42 to remove the imbalance between the two potentiometers in the servo system. It may be appreciated that the control mechanism as here above defined is merely illustrative of one arrangement which may be utilized in the practice of the invention embodied herein, and that there are other servo systems and modes of operation for controlling the rotation of the periscope to produce the same desirable result.

One of the objectives for utilizing television is to provide convenient means for observing the information at the control point and at remote locations if desired. Further, because of the high sensitivity of the television pickup tube, it is possible to process and display video data for identification which would not otherwise be discernible by ordinary optical methods.

In particular, the televised image in the form of video information from the video cameras is suitably processed and transmitted to storage devices (storage tubes) one type developed by Raytheon Corp. CK 7571. These storage tube devices have a capability of storing televised images for 30 or more seconds.

FIG. 4 shows, as part of the overall television system, a television storage system 50 having at least six storage tubes of the type specified above, each of the said storage devices being driven and synchronized by the timer generator 20. The output of each of the respective storage tube devices is then read out and coupled to individual monitors, each being connected to its corresponding storage monitor for the purpose of viewing the particular segmented area to which the television periscope has been exposed.

The panoramic display system of FIG. 4 is comprised of a sequence timing generator 20 that generates gating signals to each of the storage units so that the video signal from the TV periscope cameras is connected to the respective storage tube of the storage system 50 in proper sequence in order to electronically store the panoramic view. The video data is then routed to the respective monitor as previously described. There is connected to each of the viewing monitors an identifying sprocket driven tape, each of the respective tapes having compass numerals thereon (330, 360, 30, etc.) for the purpose of associating each particular viewing monitor with a given segment of the area being televised. Further, the tapes are connected to a gearing system 56 which is controlled by a heading indicator repeater 58, self-driven by a heading indicator transmitter 60 coupled to the rotatable portion of the periscope tube 28A. The actual periscope heading will be indicated only by the repeater and the tape on monitor #1 during selective or manual viewing. As a typical example of the functioning of the tape compass point identifying system, the periscope may be set in position I as shown by the diagram of FIG. 5 and the heading indicator transmitter will transmit this information to the heading indicator repeater 58 to rotate the necessary gears so that the tapes will show the position of the respective monitors relative to the position of the periscope. In this manner these tapes provide heading information from 0 through 360 degrees and each monitor will indicate the particular headings of the sectors being surveyed. In this way a complete panoramic identification of the surveyed area can be made for whatever purpose intended at the time.

When the periscope system is programmed in the panoramic mode, a voltage from the sequence timing generator initiates a relay 65 that disconnects the signals to the indicator repeater and at the same instant energizes a magnetic brake 66 that locks the tapes in position while the periscope sequentially scans the horizon. In this manner, the periscope heading at the instant the panoramic mode is started is indicated by the tape on display monitor #1 and the tapes for the other monitors will indicate the other five headings sequentially taken by the periscope. The tapes remain in fixed position.

Having defined the invention, what is claimed is:

1. In a submarine a panoramic TV periscope type viewing system comprising a periscope tube including a right angle lens system at the upper extremity and disposed to elevate and descend within the submarine, an image orthicon camera system within the periscope tube at the said upper extremity and disposed to receive images through the right angle lens system, a signal generator system for developing timing signals remotely connected to and synchronizing the image orthicon camera system thereto, means synchronized with the said signal generator and disposed to cause the rotation of the periscope in descrete rotational intervals to permit panoramic viewing of a complete surface area, means for receiving and storing video signal information from the image orthicon system after each viewing by the periscope and means for receiving and monitoring the storage viedo information relative to each viewing.

2. A submarine panoramic TV periscope type viewing system comprising a periscope tube including a right angle lens system at the upper extremity and disposed to elevate and descend within the submarine, a television image pickup camera system within the periscope tube at the said upper extremity and disposed to receive images through the right angle lens system, a signal generator system for developing timing signals remotely connected to and synchronizing the image pickup camera system thereto, means synchronized with the said signal generator and disposed to cause the rotation of the periscope in descrete rotational intervals to permit panoramic viewing of a complete surface area, means for receiving and storing video signal information from the image pickup camera system after each viewing by the periscope and means for receiving, monitoring, and identifying the storage video information relative to each viewing and position of the periscope.

3. A submarine panoramic TV periscope type viewing system comprising a periscope tube including a right angle lens system at the upper extremity and disposed to elevate and descend within the submarine, a television image pickup camera system within the periscope tube at the said upper extremity and disposed to receive images through the right angle lens system, a signal generator system for developing timing signals remotely connected to and synchronizing the television image pickup camera system thereto, thereby driving gear means including a Geneva mechanism synchronized with the said signal generator and disposed to cause the selective rotation of the periscope in descrete rotational intervals to permit panoramic viewing of a complete surface area, means for receiving and storing video signal information from the image pickup television camera system after each viewing by the periscope and means for receiving, monitoring, and identifying the storage video information relative to each viewing and position of the periscope.

4. In a submarine a panoramic TV periscope type viewing system comprising a periscope tube including a right angle lens system at the upper extremity and disposed to elevate and descend within the submarine, an image orthicon camera system within the periscope tube at the said upper extremity and disposed to receive images through the right angle lens system, a signal generator system for developing timing signals remotely connected to and synchronizing the image orthicon camera system thereto, means including selective mode control synchronized with the said signal generator and disposed to cause the rotation of the periscope in descrete rotational intervals according to the selected mode to permit panoramic viewing of a complete surface area, means for receiving and storing video signal information from the image orthicon system after each viewing by the periscope and means for receiving, monitoring, and identifying the storage video information relative to each viewing and position of the periscope.

5. In a submarine a panoramic TV periscope type viewing system according to claim 4 and wherein the identifying means includes a system for driving tape, each associated with a respective viewing monitor and each of the tapes disposed to have identification markings thereon in accordance with the position of the periscope tube.

6. In a submarine a panoramic TV periscope type viewing system according to claim 5 and wherein the tape driving system further includes means responsive to the Geneva gearing mechanism for synchronously positioning the said tapes and monitors according to the periscope position.

7. In a submarine a panoramic TV periscope type viewing system comprising a periscope tube including a right angle lens system at the upper extremity and disposed to elevate and descend within the submarine, an image orthicon camera system within the periscope tube at the said upper extremity and disposed to receive images through the right angle lens system, a signal generator system for developing timing signals remotely connected to and synchronizing the image orthicon camera system thereto, means including selective mode control synchronized with the said signal generator and disposed to cause the rotation of the periscope in descrete rotational intervals according to the selected mode to permit panoramic viewing of a complete surface area, means for receiving and storing video signal information from the image orthicon system after each viewing by the periscope and means for receiving, monitoring, and identifying the storage video information relative to each viewing and position of the periscope for immediate and extended periods of display and viewing.

References Cited by the Examiner

UNITED STATES PATENTS

| | | | |
|---|---|---|---|
| 2,842,760 | 7/1958 | McLucas | 178—6.8 |
| 2,905,758 | 9/1959 | Walker | 178—7.2 |
| 2,997,537 | 8/1961 | Wojcik | 88—72 |

DAVID G. REDINBAUGH, *Primary Examiner.*

R. M. HESSIN, H. W. BRITTON, *Assistant Examiners.*